July 29, 1969 J. R. HAHN, JR 3,458,822
CLOCK PULSE FAILURE DETECTOR
Filed Nov. 17, 1966 2 Sheets-Sheet 1
FIG. 1
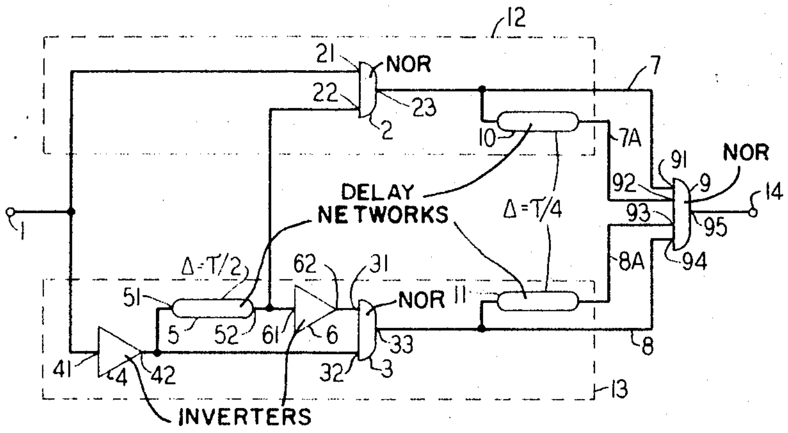
FIG. 2
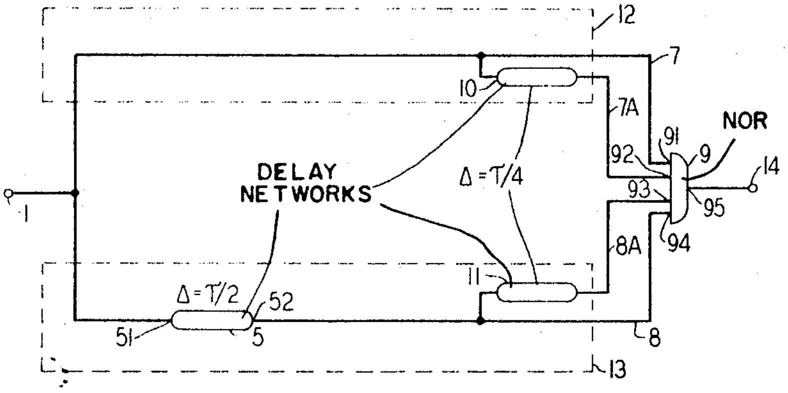
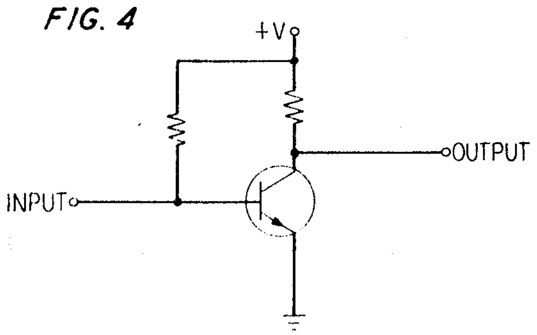
INVENTOR
J. R. HAHN JR.
BY Walter M. Hill
ATTORNEY United States Patent Office 3,458,822
Patented July 29, 1969

3,458,822

CLOCK PULSE FAILURE DETECTOR

James R. Hahn, Jr., Elon College, N.C., assignor to Bell Telephone Laboratories, Incorporated, Murray Hill, N.J., a corporation of New York Filed Nov. 17, 1966, Ser. No. 595,139
Int. Cl. H03k 5/18
U.S. Cl. 328—120 7 Claims

ABSTRACT OF THE DISCLOSURE

A clock failure detector circuit capable of sensing a failure within one-quarter clock period. The train of clock pulses, which alternate between two different voltage states, are applied to two transmission channels, the pulse train in one channel being made one-half a clock period out of phase with the train in the other channel. Each channel includes a means for deriving an additional pulse train of the same frequency but shifted in phase and all four pulse trains are applied to the input circuits of a logic gate capable of delivering an output pulse only when the pulses of all four trains are in a selected one of their two states. Should the clock fail, all four pulse trains will quickly assume the selected state to deliver the output pulse, indicating the clock failure.

Figure 3A:
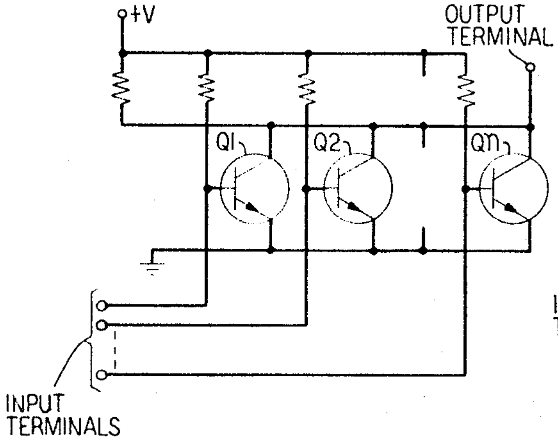

This invention relates to a detector circuit for detecting the failure of a logic system clock.

Logic system clocks are used to provide a train of pulses for controlling the operation of digital systems. If the clock should fail, the entire system becomes disabled so it is imperative that a clock failure be detected as quickly as possible to reduce the amount of down time. Auxiliary or stand-by clocks are frequently kept in operation so that they may be quickly switched into the circuit when the original clock fails. This switching operation should take place as quickly as possible and it would be most desirable to accomplish it without interrupting the operation of the digital system controlled by the clock. Some clock failure detectors of the prior art have involved a comparison circuit for comparing the operating clock with an auxiliary clock while other detectors have included multivibrator circuits. The detector circuit can be simplified and in some cases, made more reliable if it is able to recognize clock failure without reference to any other clock source and if the multivibrator circuits can be eliminated.

It is an object of this invention to detect the failure of a logic system clock to deliver pulses to an output circuit.

It is another object of this invention to detect the failure of a logic system clock within less than one-half period of its cycle.

It is a further object to detect the failure of a logic system clock either without reference to any other clock source or without the necessity of employing multivibrator circuits.

The foregoing objects are achieved by this invention by applying the clock pulses to two transmission channels. These clock pulses normally alternate between two voltage states which may be of the same or of opposite polarities or one of them may be zero. The two channels include means to derive from the clock pulses two pulse trains of the clock frequency, one train having a fixed phase relation with the clock pulses while the phase of the other train differs from that of the first one by one-half a clock period. An additional pulse train is derived from each of these two trains to form a third and a fourth train, each effectively shifted in phase by less than one-half clock period with reference to the train from which it is derived. These derived pulse trains are applied to the input circuits of a logic gate of the type that delivers an output pulse only when all of the derived pulse trains applied to it are in a selected one of their two states. Should the clock fail to deliver a pulse, all derived pulse trains will quickly assume the selected state within a time less than one-half the clock period, thereby causing the logic gate to deliver an output pulse in response to the failure. Means are included to permit the detection of the clock failure within one-quarter clock period or less.

Figures 5A, 5B:
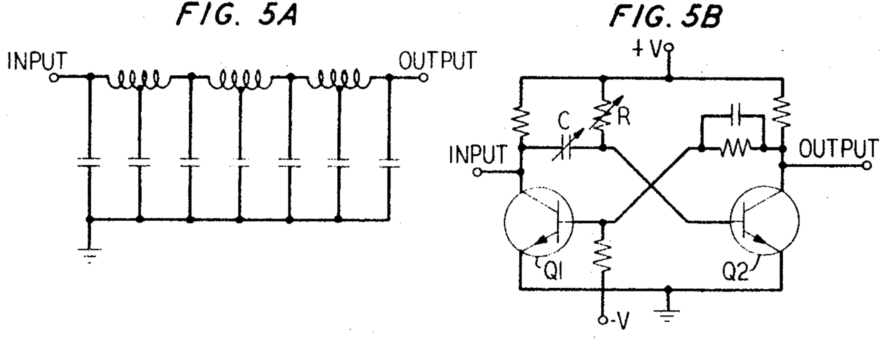
Figure 6:
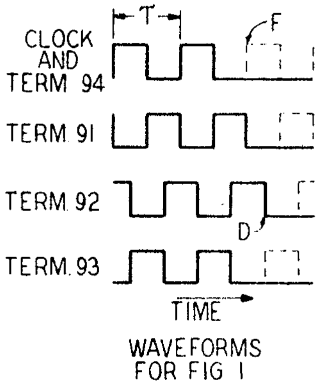
Figure 7:
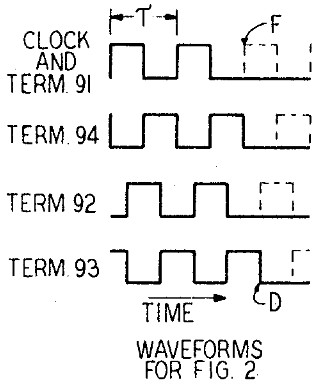

The invention may be better understood by reference to the accompanying drawings, in which:

FIG. 1 discloses a preferred embodiment of the invention;

FIG. 2 discloses a simplified embodiment of the invention, particularly suitable for the detection of clock failures which always occur in the same state of the clock pulse train;

FIGS. 3A, 3B, 4, 5A and 5B disclose some typical circuits which may be used in the various blocks shown in FIGS. 1 and 2; and FIGS. 6 and 7 disclose typical waveforms appearing at various terminals in FIGS. 1 and 2.

Referring to FIG. 1 it is assumed that a clock to be monitored is connected to the clock terminal 1 and that the clock normally delivers a constant frequency pulse train that alternates between two voltage states. This pulse train is applied to two transmission channels 12 and 13, the outputs of which are connected by way of conductors 7 and 8 to two input terminals 91 and 94 of a conventional NOR gate 9. The output terminal 95 of this NOR gate is connected to the output terminal 14 of the detector circuit. The waveforms of these pulse trains are illustrated in FIGS. 6 and 7 where the clock pulse is shown to have the period $\tau$.

A few preliminary comments may be made with reference to FIGS. 6 and 7 as they will be used in describing the operation of this invention. These figures show voltage-time waveforms appearing at the clock terminal 1 and the input terminals of gate 9 as identified at the left of each waveform. These figures represent the waveforms which exist after the clock has been connected to the detector circuit long enough to have developed waveforms at all the terminals. In each figure, the point F in the clock waveform designates the instant that the clock pulse is assumed to have failed. For simplicity, it will be assumed in each instance that the clock has failed by remaining at its lower voltage state instead of again rising as indicated by the dotted lines. Also, the point D in each figure indicates the instant that the detector circuit detects the failure and responds with an output pulse at terminal 14. It is evident that clock failure is detected at a time represented by one-quarter of the clock period $\tau$ after the failure occurred. The time lag between failure and detection can be shortened by decreasing the delay time of delay networks 10 and 11.

Channel 12 of FIG. 1 contains a NOR gate 2 having input terminals 21 and 22 and an output terminal 23. The circuit of this gate is preferably so constructed that so long as voltages of the same logic state are simultaneously applied to input terminals 21 and 22 there will be a voltage of the opposite state appearing on output terminal 23. Should the voltages applied to input terminals 21 and 22 be of opposite states, that is, the input pulse trains get out of phase with each other, the voltage at output terminal 23 promptly ceases to change and becomes fixed at a preselected one of its two states.

Block 10 in transmission channel 12 represents a delay network which is capable of delaying the pulse applied to its input terminal by an amount which may be made slightly greater than zero to an amount slightly less than one-half a clock period. As this delay period is shortened it shortens the period between clock failure and its detection. Best tolerance occurs when this delay is made one-quarter clock period. The input circuit of delay network 10 is supplied with pulses from output terminal 23 of NOR gate 2. This input pulse train is, therefore, identical to that supplied to input terminal 91 of NOR gate 9. The output terminal of network 10 is connected by way of conductor 7A to input terminal 92 of NOR gate 9. In this way, the pulse train applied to input terminal 92 will be effectively shifted in phase with reference to the pulse train applied to input terminal 91 by an amount represented by the delay time of network 10.

Transmission channel 13 contains circuitry to accomplish essentially the same function as provided by transmission channel 12 but it derives waveforms which are out of phase with those supplied to terminals 91 and 92. First of all, the clock pulse is applied to an inverter 4 which reverses its phase so that a pulse train appears at output terminal 42 exactly out of phase with the pulse train appearing at input terminal 21 of NOR gate 2. The pulse train on output terminal 42 is applied to the input terminal 51 of another delay network 5 which has a delay of exactly one-half the clock period so that a pulse train emerging from its output terminal 52 will be shifted effectively in phase with the clock train pulse appearing at terminal 21. Input terminal 22 is, therefore, connected to terminal 52 so that the clock pulses arriving at terminals 21 and 22 will be in phase under normal conditions as previously described.

The clock pulse train of reverse phase emerging from inverter output terminal 42 is also applied to input terminal 32 of NOR gate 3. It will be remembered that the pulse train appearing at output terminal 52 is in phase with the clock pulse train and, consequently, will be out of phase with the pulse train applied to NOR gate terminal 32. So that NOR gate terminal 31 will also receive a pulse train in phase with that applied to terminal 32, an inverter 6 is connected between output terminal 52 and input terminal 31. NOR gate 3 operates in the same manner previously described for NOR gate 2 and the delay network 11 operates in the same manner as delay network 10. Delay network 11 is connected to the output terminal 33 of NOR gate 3 so that the pulse train emerging from delay network 11 and applied to input terminal 93 by way of conductor 8A is effectively shifted in phase with reference to the pulse train applied to input terminal 94 from NOR gate terminal 33 by way of conductor 8.

From the above description of FIG. 1 it will be evident that so long as a continuous train of pulses are applied to clock terminal 1 a pair of pulse trains will be applied to terminals 21 and 22 which are in phase with each other. Likewise, a pair of pulse trains will be applied to NOR gate input terminals 31 and 32 which are also in phase with each other but out of phase with the pulse trains applied to terminals 21 and 22. Referring now to FIG. 6 it will be seen that the pulse train applied to terminal 94 of NOR gate 9 is in phase with the clock pulse train and that the pulse train applied to terminal 91 of the NOR gate is exactly out of phase with the clock pulse train. Therefore, the pulse trains applied to terminals 91 and 94 are out of phase with each other. Because the pulse train applied to terminal 92 is derived from that applied to input terminal 91 but is delayed one-quarter clock period, this pulse train will be one-quarter period out of phase with those applied to both terminals 91 and 94. Likewise, since the pulse train applied to terminal 93 is derived from that applied to terminal 94 but delayed by one-quarter period it, too, will be one-quarter cycle out of phase with the pulse trains applied to terminals 91 and 94 and will also be out of phase with the pulse train applied to terminal 92. These particular phase relationships apply only where the delay periods of networks 10 and 11 are made one-quarter clock period. If these periods are changed, a similar condition exists but the phase relationships will be different. The principal requirement is that so long as clock pulses are continuously applied to clock terminal 1 there will be four trains of pulses applied to the four input terminals of NOR gate 9, no two of which are in the same phase. It will also be observed that at any instant at least two of these waveforms are in opposite voltage states. This relationship is essential for this embodiment of the invention in order that the NOR gate will maintain a zero output so long as the clock is running normally. Should a failure occur, as indicated at the instant F in FIG. 6, the pulse trains on each of the four input terminals to NOR gate 9 will thereafter fail to rise so that one-quarter period after the failure the failure will be detected. This occurs in FIG. 6 when the waveform applied to terminal 92 changes to its lower voltage state where it remains. At this instant, which is indicated by the letter D, it will be seen that all four waveforms are now in their lower voltage state. As previously described, when this condition exists a pulse will appear at the output terminal 95 of the NOR gate and, consequently, will be applied to the detector output terminal 14.

While the description of the circuit operation for FIG. 1 presupposes a clock failure where the clock remains in its lower voltage state, a similar analysis of the circuit operation will show that when the clock fails in the upper voltage state the circuit operates in a similar manner and also produces an output pulse on terminal 14.

FIG. 2 shows a greatly simplified version of FIG. 1 which is quite satisfactory where it is necessary to detect clock failure in only one of its two states. It will be remembered that the clock could fail in either of its two voltage states but in FIG. 2 it is assumed that the failure will occur in the lower voltage state by reason of the clock failing to rise to its upper voltage state. This is graphically illustrated in the clock pulse train of FIG. 7 where the failure is indicated by F. It may also be assumed, for simplicity, that the lower voltage state is zero volts. In FIG. 2, conductor 7 connects clock terminal 1 directly to the input terminal 91 of the NOR gate 9. Terminal 92 receives a pulse train derived from the pulse train applied to terminal 91 by means of a delay network 10 which may delay the pulse for a period ranging from slightly greater than zero to slightly less than one-half clock period. The maximum margin of operation is obtained when this delay period is made one-quarter the clock period. The clock pulse applied to channel 13 is delayed by one-half clock period by delay network 5 so that the pulse train emerging from its output terminal 52 may be applied directly to terminal 94 by way of conductor 8. Therefore, terminal 94 is receiving a waveform exactly out of phase with that applied to terminal 91. This is evident by comparing the waveforms for these two terminals in FIG. 7. The pulse train applied to terminal 93 is obtained by deriving a delayed pulse from terminal 52 through delay network 11, the output terminal of which is applied to terminal 93 by way of conductor 8A. The effect of these three delay networks is to apply pulse trains to the four input terminals of gate 9, no two of which are in the same phase so that at any instant at least one of them is in its upper voltage state. As previously described, gate 9 will maintain a zero voltage condition at its output terminal 95 so long as this phase relationship continues. Should, however, the clock pulse fail as indicated at point F in FIG. 7, the pulses on all four input terminals of gate 9 promptly fail to rise, the last one returning to its lower or zero voltage state on terminal 93 one-quarter clock period after the failure occurs. The failure is then indicated by a pulse appearing on output terminal 95 and on the detector circuit output terminal 14.

Figure 3B:
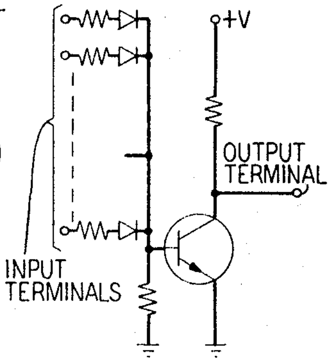

FIGS. 3A and 3B disclose two typical gates which are quite conventional and which may be used in blocks 2 and 3 of FIG. 1 or for block 9 in either of the figures. These circuits are conventional and require very little description. In FIG. 3A it will be observed that a plurality of transistors have their collectors and emitters connected in parallel. Assuming that the clock pulses are to vary between a positive voltage state and a zero voltage state, the emitters are grounded and the collectors are connected to a positive source of voltage through a resistor. If this circuit is to be applied to one of the NOR gates, for example, NOR gate 2 of FIG. 1, only two transistors would be used and their bases would be connected to input terminals 21 and 22. The output terminal of FIG. 3A would become terminal 23 of FIG. 1. It will be evident that whenever a positive pulse is applied to the base of either transistor, the output terminal will be brought to substantially ground potential and that whenever both input terminals are brought to zero, the transistors will open and the output terminal will rise to a positive voltage. The effect of this is to produce on output terminal 23 a voltage waveform of phase opposite to that of the two input waveforms. It is also evident that should the two input waveforms get out of phase for any reason the output terminal will remain at zero potential.

The mode of operation for the gate shown in FIG. 3B is substantially the same although it is achieved by different means. The circuit is essentially the same as that disclosed in "Pulse and Digital Circuits" by Millman and Taub (1956), page 394. The addition of the transistor circuit is merely to provide an inverter so that the output terminal will be brought to zero potential when either of the two input waveforms is in its upper voltage state.

When the circuits of FIGS. 3A and 3B are to be used as the NOR gate 9 in either FIG. 1 or FIG. 2 it will be required and it will also be apparent that should the input waveforms all become zero an output pulse will immediately appear at the output terminal.

The inverter circuit shown in FIG. 4 is also of conventional form and may be used as inverters 4 and 6 in FIG. 1.

Two typical delay means which may be used for blocks 5, 10 and 11 are shown in FIGS. 5A and 5B. FIG. 5A discloses a purely passive network which will deliver an output pulse of essentially the same waveform as the input pulse but delayed in time. FIG. 5B shows a one-shot multivibrator circuit which will perform essentially the same function. The length of its period is determined by the time constant of capacitor C and resistor R, both of which are shown variable. The operation of this multivibrator circuit is well known and quite conventional. A description of its operation in a circuit employing vacuum tubes instead of transistors Q1 and Q2 may be found in the above cited reference to "Pulse and Digital Circuits," page 175.

While specific circuits have been disclosed embodying the principles of this invention, it will be quite evident to those skilled in this art that other arrangements embodying the same principles may be constructed without departing from the scope of this invention. For example, in FIG. 1 a different circuit arrangement may be constructed by transferring the inverter block 4 from transmission channel 13 to transmission channel 12 and connecting it in the lead to input terminal 21. The effect of this is merely to apply to terminal 21 a pulse train exactly out of phase with the clock pulse while terminals 32 and 51 of channel 13 will receive a pulse train in phase with the clock pulse train. The circuit operation otherwise is essentially identical to that already described for FIG. 1. Also, FIG. 2 has been described as a simplified embodiment adaptable for the detection of a failure of the clock pulse in only one of its states. This circuit may be modified to detect failures in either state by simply adding a conventional AND gate having four input terminals and a conventional OR gate having two input terminals. The four input terminals of the AND gate should be connected in parallel with terminals 91 through 94 of gate 9. Then the output terminal of gate 9 and the output terminal of the new AND gate are each connected to the input terminals of the added OR gate. It will now be evident that if this new AND gate is arranged so its output remains zero so long as any input is in its lower voltage state and that a pulse will appear at its output at any instant that all inputs are in their upper voltage state, the new gate will respond with an output pulse when the clock fails in its upper votlage state. Consequently, the circuit thus modified would detect either mode of failure. These and other similar modifications will be obvious to those skilled in logic circuit design.

What is claimed is:

1. A circuit means for detecting the failure of the pulses from a logic system clock comprising a clock terminal to which a clock to be monitored may be connected to receive pulses from said clock, two transmission channels coupled to said clock terminal including means responsive to said pulses for developing in one channel a first pulse train having a fixed phase relation with the pulses from said clock and in the other channel a second pulse train differing by one-half of the clock period with reference to said first pulse train, means also included in said channels to derive a third pulse train from said first pulse train and a fourth pulse train from said second pulse train, said third and fourth pulse trains being effectively shifted in phase with reference to the pulse trains from which they are derived by an amount less than one-half of the clock period so that no two of said four pulse trains are in phase, a logic gate having four input terminals and an output terminal and including means for developing a pulse on its output terminal only when no pulses are present on any of its four input terminals, and means connecting the two transmission channels to said logic gate to apply said four pulse trains to the four input terminals of said gate.

2. The combination of claim 1 wherein each of said two channels contains a NOR gate and a delay means, said NOR gates each having two input terminals and an output terminal, each of said first and second pulse trains comprising a series of pulses alternating between two different voltage states, circuit means supplying clock pulses to the two input terminals of one of said gates effectively in phase with one of said two voltage states and clock pulses to the two input terminals of the the other gate effectively in phase with the other of said two voltage states, means in each channel connecting the delay means to its gate output terminal to derive one of said pulse trains from the delay means and another of said pulse trains from the gate output terminal, said delay means each having a delay time greater than zero but less than one-half the clock period.

3. The combination of claim 2 wherein the delay time of each of said delay means is substantially equal to one-fourth the clock period.

4. The combination of claim 1 wherein one of said channels contains a conductor connected to said clock terminal transmitting the clock pulse itself to derive a first one of said pulse trains, the other channel contains a delay means connected to said clock terminal having a delay time of substantially one-half the clock period to derive a second of said pulse trains, and each channel contains a delay means having a delay time greater than zero but less than one-half the clock period, said last two delay means being connected respectively to receive said first and second derived pulse trains to derive therefrom two additional pulse trains.

5. The combination of claim 4 wherein said last two delay means each have a delay time substantially equal to one-fourth the clock period.

6. A circuit means for detecting the failure of the pulses from a logic clock system comprising a clock terminal to which a clock to be monitored may be connected to receive pulses from said clock, two transmission channels coupled to said clock terminal and including means responsive to said clock pulses for developing in one channel a pulse train effectively in phase with the pulses from said clock and in the other channel a pulse train effctively out of phase with said clock pulses a NOR gate having four input terminals and an output terminal, means connecting one of said channels to one of said gate input terminals and the other channel to another gate input terminal, a first delay means connecting one of said channels to a third gate input terminal and a second delay means connecting the other channel to the fourth gate input terminal, each of said delay means having a delay time less than one-half period of the clock pulses.

7. The combination of claim 6 wherein said means responsive to said clock pulses includes a delay circuit to develop the pulse train in said other channel, said delay circuit having a delay time equal to one-half the period of said clock pulses.

References Cited

UNITED STATES PATENTS 2,984,789 5/1961 O'Brien ------------ 328—120

ARTHUR GAUSS, Primary Examiner

JOHN ZAZWORSKY, Assistant Examiner

U.S. Cl. X.R.

307—215, 232, 234